(12) United States Patent
Zhou

(10) Patent No.: US 8,110,943 B2
(45) Date of Patent: Feb. 7, 2012

(54) ENERGY-SAVING POWER SOCKET WITH SLAVE POWER SUPPLY

(75) Inventor: Jian-Lin Zhou, Dong-guan (CN)

(73) Assignee: MIG Technology Inc., Taipei (TW)

( * ) Notice: Subject to any disclaimer, the term of this patent is extended or adjusted under 35 U.S.C. 154(b) by 301 days.

(21) Appl. No.: 12/426,766

(22) Filed: Apr. 20, 2009

(65) Prior Publication Data

US 2010/0264734 A1 Oct. 21, 2010

(51) Int. Cl.
*H02J 3/14* (2006.01)
(52) U.S. Cl. ......................................................... 307/39
(58) Field of Classification Search ...................... 307/39
See application file for complete search history.

(56) References Cited

U.S. PATENT DOCUMENTS

2008/0261453 A1* 10/2008 Chen ......................... 439/620.08
* cited by examiner

*Primary Examiner* — Jared Fureman
*Assistant Examiner* — Hal Kaplan

(57) ABSTRACT

An energy-saving power socket with slave power supply, especially a power socket having plural receptacles, with power supply of part of the receptacles depending upon a working condition of a master receptacle of primary load that the slave receptacles are turned off when an electric appliance which takes electricity from the primary load receptacle stops working, primarily connects an end of an electronic control circuit to a manual switching device, an end of which is connected to the slave receptacles. When the control circuit operates, the slave receptacles will be guided to supply electricity, depending upon the working condition of the master receptacle. In addition, the control circuit does not consume electricity while not working.

1 Claim, 2 Drawing Sheets

ENERGY-SAVING POWER SOCKET WITH SLAVE POWER SUPPLY

BACKGROUND OF THE INVENTION a) Field of the Invention

The present invention relates to an energy-saving power socket with slave power supply, and more particularly to a power socket which is provided with plural receptacles, wherein power supply for part of the receptacles is determined by a working status of a master receptacle of primary load that when a main appliance, electricity of which comes from the receptacle of primary load, stops working, slave receptacles will cut off the power supply associatively, without turning off appliances of the slave receptacles, thereby avoiding those appliances to be idle to waste electricity, and allowing a control circuit not to waste electricity while not working.

b) Description of the Prior Art

Due to functional particularity, electromechanical or electronic equipment should be divided into individual units which are assembled for system application. For example, a computer should have a computer host, fitting with slave appliances of individual units, such as a printer, a monitor, a speaker, a router or a share, that a usage of information operation, communication, data access or file storage can be satisfied. These apparatuses are assembled into a single information system. Another example is for household air conditioning, where a low temperature needs to be produced by a freezing machine to reduce an indoor air temperature. Although the freezing machine is provided with a blower to blow out cold air, its flow rate cannot satisfy a sweeping requirement that the cold air is distributed in every corners in a room; therefore, an air flow agitation device, such as a fan, is needed to act as a power source for air circulation and distribution. Even dandily, an air filtering device is used to remove dust raised by air flow and achieve a germicide effect, thereby maintaining air cleanness in the room. Moreover, a humidifier is used as an aid to avoid moisture on skins from being sucked dry, allowing indoor air to achieve a clean and safe condition. Therefore, the humidifier and the fan for air agitation, combined with the aforementioned freezing machine, constitute an indoor air conditioning system.

The aforementioned two systems operate by the primary load computer host and freezing device which consume the most of electricity. If these two primary actors shutdown, then other slave apparatuses will become a secondary requirement and therefore are usually turned off along with the primary apparatuses, such as that when the computer host stops working, the monitor does not need to work. In addition, if those slave apparatuses, such as the router or the printer, are not turned off, then an idle state in which electricity is wasted will be formed. Therefore, if the slave apparatuses can shutdown at a same time when the primary apparatuses do, then a large amount of careless energy waste can be saved, and a complex shutdown procedure can be reduced as the slave apparatuses are turned off simultaneously with the primary apparatuses.

Regarding a design of slave control power supply, there is a design using an electromechanical control method on the existing Taiwan market, wherein a working state of the primary load is utilized to control the power supply of a slave switch set, and an exciting coil is serially connected on a power loop of primary power source that when the exciting coil senses a working current in a circuit of primary power socket, junctions of a relay are conducted by an instruction, allowing electricity to supply to all secondary power sockets. That design requires normal consumption of electricity, and the current needed by the pure electromechanical control method is larger. Furthermore, due to the multiple junctions, a current conduction can be influenced by resistance generated by the junctions, and there will be a heating problem from the resistance effect.

SUMMARY OF THE INVENTION

Accordingly, in the present invention, plural slave receptacles are chosen at a power input end to supply electricity depending upon a master receptacle, through a manual switching device. On a loop of the power input end and the chosen master receptacle, an electronic control circuit is triggered. The control circuit is provided with a current induction unit. When the master receptacle is used and the control circuit is activated by the manual switching device, the control circuit will acquire a working current signal of the master receptacle from the current induction unit. The signal will be processed by a judging device to determine whether a relay switch can supply electricity to the slave receptacles. On the other hand, when the manual switching device is switched to direct, the electricity at the power input end can be supplied to the slave receptacles directly, avoiding a control of the control circuit. Therefore, the slave receptacles can be used normally, with an energizing state same as that of the power input end. At this time, as the power is cut off, the control circuit does not need to work and does not waste electricity, thereby saving energy.

By utilizing the manual switching device and the electronic operation of the control circuit, the present invention can accurately control the slave receptacles to supply electricity normally or in a slave mode and to operate in low energy. In addition, when the manual switching device selects to provide the electricity at the power input end to the slave receptacles directly, the control circuit does not need to consume electricity, which is the primary object of the present invention.

A further object of the present invention is to utilize an electronic control circuit which includes a current induction unit, a judging device, a relay switch, a rectifier unit, and a switching device, which, through a manual operation, can supply electricity directly to slave receptacles or switch to the control circuit, allowing the slave receptacles to follow a master receptacle to supply electricity indirectly, through decision of the control circuit. The master receptacle conducts a power input end normally, and in a loop of the master receptacle and the power input end, the current induction unit is provided to induct normally. When the current induction unit inducts that the master receptacle is being used, a current signal is provided to the control circuit for decision, and a relay switch is instructed to operate, allowing the slave receptacles to acquire the supply electricity. On the contrary, the control circuit will stop providing electricity to the slave receptacles.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
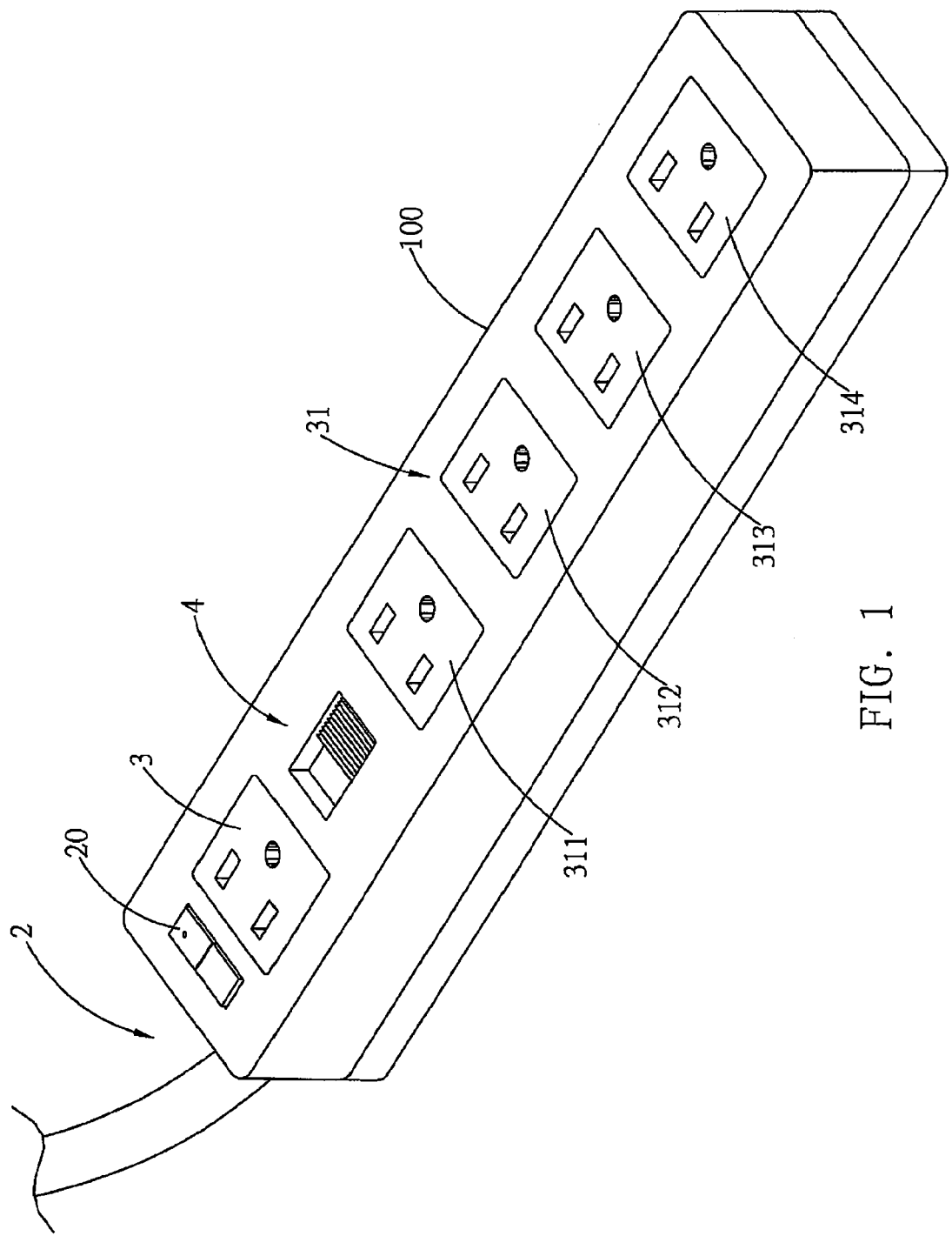
FIG. 1 shows a three-dimensional view of the present invention.

Referring to FIG. 1, the present invention provides a serially extended power socket 100 for application in energy-saving and automatic power shutdown. The power socket 100 is commonly used in total equipment of information apparatuses, such as a computer.

A power source of the power socket 100 is acquired by a power input end 2 and whether the power source is used can be determined from a main power switch 20. A master receptacle 3 and plural slave receptacles 31 are selected in the socket 100, between them is a manual switching device 4, so that a power supply condition of the plural slave receptacles 31 can be the same as that of the master receptacle 3 normally, or can be dependent upon whether the master receptacle 3 is energized.

The slave receptacles 31 include respectively a first slave receptacle 311, a second slave receptacle 312, a third slave receptacle 313 and a fourth slave receptacle 314, each of which provides electricity respectively to a slave appliance, such as a monitor, an audio device, a speaker, a router or a share of computer information equipment.

In addition to being applied to the aforementioned power socket 100 to extend a distance for a computer system, the present invention can be even implemented on a power socket of plural receptacles on a fixed wall, or attached on a machine of electric equipment, such as an audio machine, with plural power sockets easily parallel out from a power cord. By introducing the present invention, when a main power switch is turned off, other slave appliances can be still provided with electricity for use, such as fitting with an indoor illumination light. Therefore, the present invention is provided with practicability for being attached to an electric machine.

Figure 2:
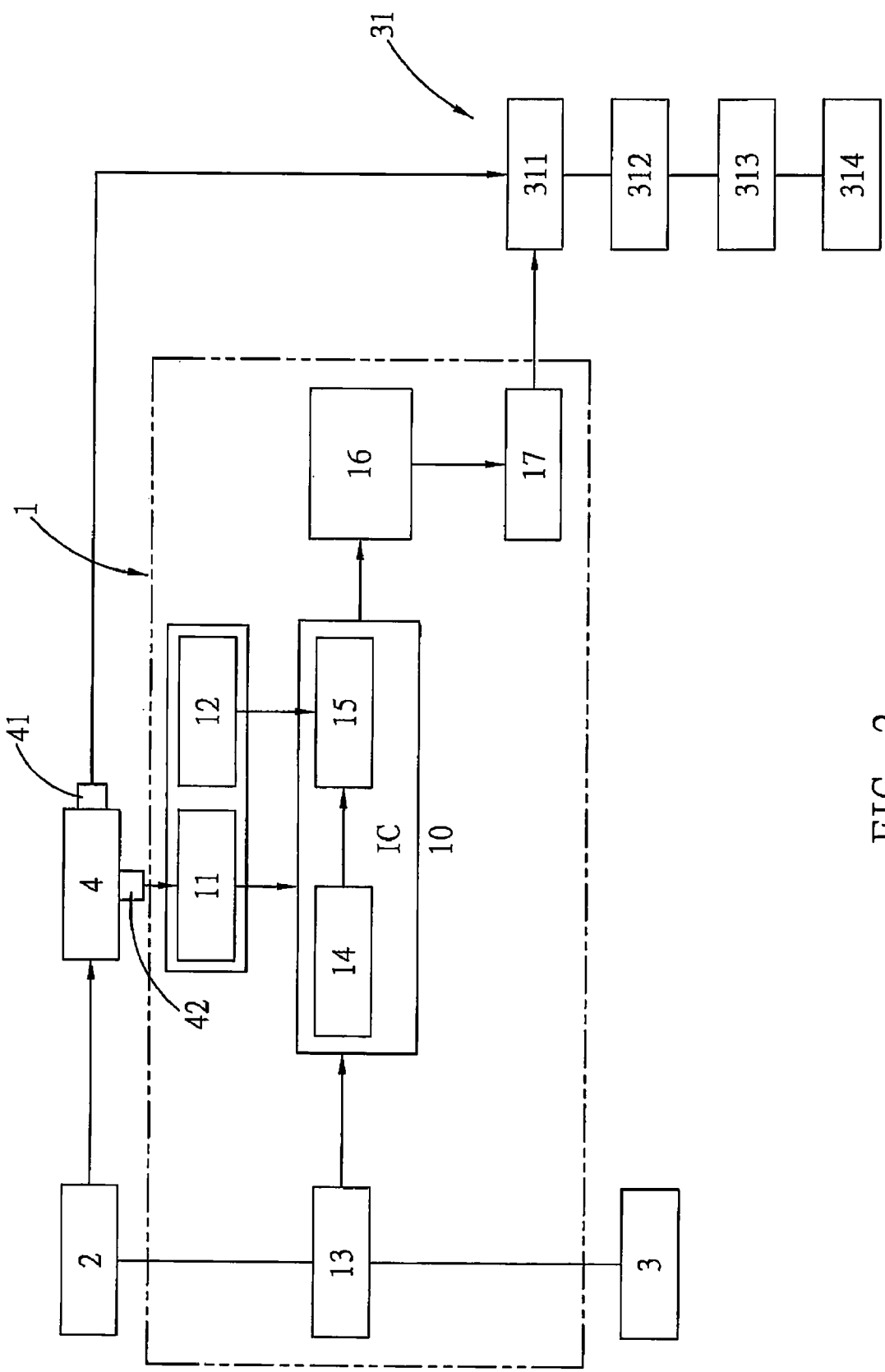
FIG. 2 shows a circuit diagram of the present invention.

Referring to FIG. 2, the concept of slave power supply of the present invention is to utilize the manual switching device 4, where electricity is provided to the slave receptacles 31 directly or through determination of a control circuit 1 indirectly, according to electricity at the power input end 2. The manual switching device 4 is provided between the slave receptacles 31 and the power input end 2, and is provided with two output ends 41, 42 optionally working according to a manual switching. The output end 41 is directly connected to the slave receptacles 31; and the output end 42 is connected to the slave receptacles 31 through the control circuit 1. Therefore, a current from the power input end 2 can flow to the slave receptacles 31 through the output end 41 or through both of the output end 42 and the control circuit 1, according to the manual switching. When the output end 41 is working, the slave receptacles 31 are functioned as ordinary power supply receptacles without control and the electricity from the power input end 2 is directly provided to the slave receptacles 31. When the output end 42 is working, the electricity provided to the slave receptacles 31 from the power input end 2 is determined by the control unit 1. Whereas, the master receptacle 3 is directly provided with electricity from the power input end 2.

Between the master receptacle 3 and the power input end 2 is provided with a current induction unit 13, and the control circuit 1 determines the electricity provided to the slave receptacles 31 according to the current flow through the current induction unit 13.

The working power of the control circuit 1 is acquired depending upon the manual switching device 4. When the manual switching device 4 is switched to the control circuit 1, electromotive force will be acquired by a rectifier unit 11 and converted to low-voltage electricity, which is rectified to a direct current, forming a working current required by the control circuit 1. On the contrary, if the manual switching device 4 is switched to the slave receptacles 31, then the control circuit 1 will lose current to shutdown; whereas, the slave receptacles 31 will acquire electricity and restore to ordinary power receptacles without control.

The control circuit 1 is forced to work by the current of the manual switching device 4. The control circuit 1 is provided with a judging device 10 which includes a signal processor 14 and a voltage comparator circuit 15. When the rectifier unit 11 acquires the working current through the manual switching device 4, a base voltage signal will be generated at a base voltage generation end 12 and be provided as a reference value for comparison.

When the manual switching device 4 directs electricity to the control circuit 1 and selects to indirectly operate the slave receptacles 31 to supply electricity in the slave mode, the control circuit 1 acquires the working power from the rectifier unit 11 to operate, wherein after the control circuit 1 acquires the working current signal of the master receptacle 3 from the current induction unit 13, the signal will be handed over to the judging device 10 for comparison. The signal acquired from the current induction unit 13 is first provided to the signal processor 14 to be processed, and then handed over to the voltage comparator circuit 15. When the voltage comparator circuit 15 acquires a reference voltage from the base voltage generation end 12, and the signal transmitted from the signal processor 14 determines that the master receptacle 3 is being used, which means that a host is operating, the voltage comparator circuit 15 will determine that a driving circuit 16 should operate, by comparing with the base voltage produced by the base voltage generation end 12, and the driving circuit 16 will further produce a driving current to drive a relay switch 17 which conducts electricity to provide to the slave receptacles 31, allowing the slave receptacles 31 to acquire electricity. The slave receptacles 31 include respectively the first slave receptacle 311, the second slave receptacle 312, the third slave receptacle 313 and the fourth slave receptacle 314, which provide for a printer, a speaker or a share to use.

On the other hand, when the manual switching device 4 selects to transmit electricity at the power input end 2 to the slave receptacles 31 directly, each slave receptacle 31 will form a same condition as the master receptacle 3 and is used as a normal receptacle. Furthermore, as the manual switching device 4 switches a direction of electricity, the control circuit 1 loses power supply and therefore, will not consume electricity in addition to not working.

As the control circuit 1 is operated by an electronic device, the judging device 10 can form an IC circuit and will not produce large quantity of waste heat while working. Moreover, using an IC working method of low electricity, opposed to a conventional electromechanical control, can largely save the working power and avoid the waste heat. In the present invention only the relay switch 17 includes electromechanical element, and the current induction unit 13 can use any inductor which is in a loop of the power input end 2 and the master receptacle 3.

According to the aforementioned control circuit 1, the present invention can be implemented to minimize the power socket 100 and be operating with low electricity consumption. In addition, through the direct or indirect mode of operation of the manual switching device 4, the slave receptacles 31 can operate the same as the master receptacle 3 or operate following the master receptacle 3, thereby forming multi-functional application. When the manual switching device 4 selects the direct mode, and the electricity at the power input end 2 directly supplies to the slave receptacles 31, the control circuit 1 is completely shut off without consuming electricity. Therefore, under a long term of direct use, the control circuit 1 can further save energy.

The present invention employs functions of a master-slave link switch, achieving objects of easy operation and energy saving by applying the electric system easily from that the electromechanical equipment of primary load determines the simultaneous shut-off of the slave appliances to that with a single operation, the slave appliances can be turned off.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An energy-saving power socket with slave power supply, the power socket having plural receptacles, with power supply of part of the receptacles selectively depending upon a working condition of a master receptacle, comprising a power input end; the master receptacle which is electrically connected with the power input end; at least one slave receptacle; a manual switching device, which is electrically connected at the power input end and is provided with two alternate switching output ends, with one output end being electrically connected to the slave receptacle; and an electronic control circuit further including a rectifier unit, which is electrically connected to the other output end of the aforementioned switching device to acquire a working current, and makes a base voltage generation end to output a base voltage; an inductor which is provided between the power input end and a master receptacle; a judging device, which is electrically connected with the rectifier unit, an end of the judging device is connected to the base voltage generation end, and another end of the judging device is connected with the inductor; a driving circuit which receives an instruction of the judging device to operate and produce a working power; and a relay switch which conducts electricity to the slave receptacle, which receives the working power generated by the aforementioned driving circuit to operate and supply electricity to the slave receptacle.

* * * * *